United States Patent [19]

Ferrari

[11] Patent Number: 4,506,207
[45] Date of Patent: Mar. 19, 1985

[54] STEP MOTOR DRIVING CIRCUIT

[75] Inventor: Gianpietro Ferrari, Milan, Italy

[73] Assignee: Honeywell Information Systems Italia, Milan, Italy

[21] Appl. No.: 537,917

[22] Filed: Sep. 30, 1983

[30] Foreign Application Priority Data

Oct. 6, 1982 [IT] Italy ............................... 23622 A/82

[51] Int. Cl.³ .......................................... H02K 29/04
[52] U.S. Cl. .................................... 318/696; 318/685
[58] Field of Search ............................... 318/696, 685

[56] References Cited

U.S. PATENT DOCUMENTS 4,253,052 2/1981 Meier ................................. 318/696

Primary Examiner—S. J. Witkowski
Assistant Examiner—Saul M. Bergmann
Attorney, Agent, or Firm—Nicholas Prasinos

[57] ABSTRACT

A step motor driving circuit, wherein the motor has two pairs of magnetically coupled windings (1, 2 and 3, 4) and includes switching transistors (9, 10, 11, 12) associated to the windings, diodes (15, 16, 17, 18) in parallel to the switching transistors for the recycle of the current induced during the possible current chopping and the phase switching, and a diode (6–8) and a capacitor (5–7), in parallel to each other and series connected between the voltage source, and each pair of magnetically coupled windings. When a phase is de-energized, the driving circuit allows the recovery of the energy stored in such phase by charging the capacitor coupled to it. From such capacitor the energy is then returned to the phase magnetically coupled to the previous one in case of phase switching or to the same phase in case of current chopping. The driving circuit speeds up the phase switching and therefore increases the torque delivered by the motor at high frequencies.

2 Claims, 3 Drawing Figures

STEP MOTOR DRIVING CIRCUIT

BACKGROUND OF THE INVENTION

1. Field of the Invention

The present invention relates to a step motor driving circuit for driving step motors provided with pairs of phase windings magnetically coupled.

2. Description of the Prior Art

The step motor driving circuits must generally fulfill several requirements. One requirement is to obtain high torque for different rotation speeds. Another requirement is to achieve a high system efficiency (that is, cutting of power losses relative to the active power produced). It is known that the torque available on the step motor shaft is proportional to the inductance of the motor winding and to the current flowing into the windings. Such torque decreases as the rotation speed of the motor increases. In fact, during static conditions some preestablished phase windings are continuously energized. When the motor is caused to rotate, its phase windings are periodically and selectively energized in relation to the requested speed. Accordingly during static conditions the value of the current flowing into the phase windings is limited only by the resistance of such windings. Under dynamic conditions the current is further limited by the inductance of the phase windings, and varies with time according to a time constant $\tau = L/R$ where L and R are respectively the inductance and the resistance of the phase windings. The maximum current value which is reached in the energized phase windings is therefore conditioned by the energization period; i.e., by the energization frequency. In case of very low energization frequencies and therefore of very long energization periods, longer than the time contant $\tau$, the current flowing into the energized phase windings may reach values very close to the steady state currents obtainable in static conditions. In case of high energization fequencies, and therefore of energization periods shorter than the time contant $\tau$, the current flowing into the energized phase windings reaches maximum values which are lower than the steady ones; in particular the higher the energization frequency, the lower such current values are.

In order to increase the torque delivered by a step motor at high energization frequencies, the energization current must rapidly rise when the phase windings are energized and rapidly fall to zero when the phase windings are de-energized. This can be obtained in several ways. One solution is to modify the characteristics of the circuits including the windings in such a way as to reduce the related time constant. For instance an additional resistance may be connected in series to the windings and, at the same time, the supply voltage may be increased in order to maintain the steady value of the energization current unchanged. Such a solution, however, reduces greatly the system efficiency because of the power dissipated by the additional resistance. Additionally there are technological and economical limits in the use of high supply voltages. In order to avoid a degradation of the system efficiency, the supply voltage may be increased, although within certain limits, without using additional resistances. A solution of such kind involves the use of control circuits which maintain the current flowing into the energized windings within preestablished limits. The most used energization current control circuits are the ones disclosed in U.S. Pat. Nos. 4,107,593 and 3,812,413.

Another solution is to feed the windings with two voltages: a high voltage used during the initial energization period and a lower voltage used successively to hold the current to a predetermined value. Such a solution is described in U.S. Pat. No. 3,659,176. In U.S. Pat. No. 4,253,052 an additional solution is suggested and described. According to such patent the energy stored in a winding which has to be demagnetized is transferred, through an auxiliary inductor, to a capacitor connected in series to a phase winding to be subsequently energized. Each phase winding is provided with a capacitor connected in series to the supply voltage and to the same winding. When the winding is energized, the supply voltage is therefore the sum of the power supply voltage and of the capacitor charging voltage. Such supply voltage decreases as the capacitor discharges. The magnetic energy stored into an energized winding is therefore recovered and used to energize successively another winding. This approach is embodied by means of very complex control circuits and may be only used if the several motor windings have both their ends accessible and not directly connected.

In the last-mentioned U.S. patent, with reference to FIG. 4, a simpler solution is also disclosed, but it may be used in "full stepping operation" step motors. According to such simpler solution the energy stored in an energized phase winding is transferred, as soon as such winding is deenergized, to a capacitor coupled to a different phase winding and no additional inductor is used. Such a solution cannot be used in step motors provided with chopping current control systems, unless devices limiting the capacitor charge are provided. Moreover it requires that a capacitor and a by-pass diode be coupled to each phase winding. Furthermore, the demagnetization of the winding which is de-energized is relatively slow because it takes place with a demagnetization voltage which varies according to the charging voltage of the capacitor; i.e., from 0 to the maximum charging voltage reached by the capacitor.

These problems are overcome by the step motor driving circuit of the present invention which is suitable for step motors provided with pairs of magnetically coupled windings.

OBJECTS OF THE INVENTION

It is an object of the invention to provide an improved step motor driving circuit.

It is another object of the invention to allow for recovering the energy stored in a phase winding, as soon as it is de-energized, by transferring such energy to a capacitor.

It is still a further object of the invention to return the energy from such capacitor to the winding magnetically coupled to the previous one or to the same winding where chopping is working.

Another object of the invention is to demagnetize a phase winding with a voltage given by the sum of the capacitor charging voltage and of the supply voltage. This involves a faster winding demagnetization.

It is yet another object for the magnetization to take place more quickly by occurring at a variable energization voltage given by the sum of the constant supply voltage and of the charging voltage of the capacitor coupled to the winding which is magnetized.

These and other objects of the invention will become obvious upon a reading of the specification together with the drawings.

SUMMARY OF THE INVENTION

The invention acts positively in order to hasten both the demagnetization and the subsequent magnetization in opposite direction, and therefore makes for particularly fast phase switching. The features of the driving circuit of the present invention are obtained by using only one capacitor associated to each pair of windings magnetically coupled, only one by-pass diode in parallel to such capacitor and one by-pass diode in parallel to each phase driving transistor. As a limit, it is also possible to use only one capacitor and one by-pass diode for the whole winding set.

BRIEF DESCRIPTION OF THE DRAWINGS

These features and the advantages of the invention will appear more clearly from the following description of a preferred embodiment of the invention and from the enclosed drawings where.

DETAILED DESCRIPTION OF THE PREFERRED EMBODIMENT

Figure 1:
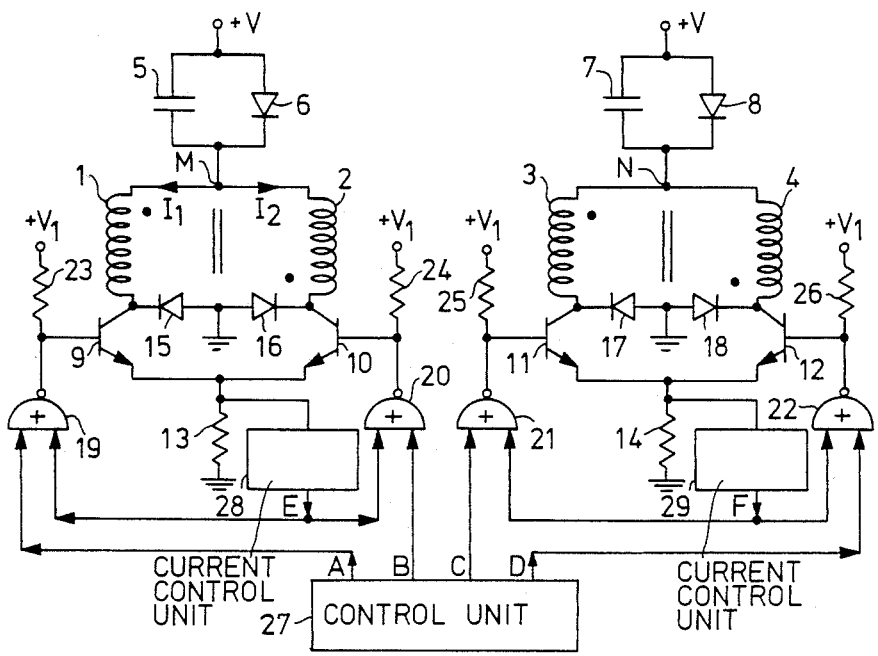
FIG. 1 is the wiring diagram of the driving circuit of the present invention.

Referring to FIG. 1 there is shown the driving circuit of windings or phases 1, 2, 3, 4 of a four-phase step motor. Phases 1, 2 and phases 3, 4 are magnetically coupled. Terminal M(N), common to windings 1, 2 (3, 4), is connected to a D.C. supply voltage source +V through a capacitor 5 (7) in parallel to a diode 6 (8). The anode of diode 6 (8) is connected to voltage source +V. The other end of winding 1 (2, 3, 4) is connected to the collector of a switching transistor 9 (10, 11, 12). The emitter of transistors 9, 10 is connected to ground through a resistor 13 having reduced resistance value, for instance 0.5Ω. Likewise the emitter of transistors 11, 12 is connected to ground through a resistor 14 having a resistance value equal to the one of resistors 13. A recycle and demagnetization diode 15 (16, 17, 18) is coupled between the collector of switching transistor 9 (10, 11, 12) and ground; the diode anode being connected to ground. The base of transistor 9, (10, 11 12) is connected to the output of a two-input NOR gate 19 (20, 21, 22) of the "open collector" type and to a continuous voltage source +V of suitable value, through a resistor 23 (24, 25, 26). A control signal A, B, C, D is applied to a first input of NOR gates 19, 20, 21, 22 respectively. Signals A, B, C, D are provided by a control unit 27 whose desription is omitted as it is beyond the scope of the invention and embodiments of it are well known to people skilled in the art. Control unit 27 generates signals A, B, C, D according to a suitable sequence so as to control the motor working in a predetermined fashion. Signals A, B, C, D may have a logical-/electrical level 1 or 0 and the only condition they have to meet is that signals A, B have to be mutually exclusive, as well as signals C, D. A control signal E, generated by a control circuit or "chopper" 28, is applied to the second input of NOR gates 19, 20. In similar fashion a control signal F, generated by a control circuit or "chopper" 29, is applied to the second input of NOR gates 21, 22. (Control circuits 28 and 29 are not described in detail as they are beyond the scope of the invention and embodiments of them are well known to people skilled in the art.) Control circuit 28 (29) receives at its input terminal the voltage drop present on resistor 13 (14); that is, a voltage signal proportional to the current flowing into the energized winding (not to the recycle or demagnetization current), and generates at its output terminal a signal E (F) which is applied to logical level 1 for a preestablished time interval as soon as the current flowing into the energized winding reaches a predetermined value. Transistor 9 is ON when both signals A and E are at logical level 0. As soon as only one of signals A or E rises to logical level 1, transistor 9 is OFF. The above considerations are valid for transistors 10, 11, 12, which are ON when both signals B, E or C, F or D, F respectively are at logical level 0. More particularly the characterizing and innovative features of the described driving circuit is given by capacitors 5, 7 and diodes 6, 8 in combination with the other elements. The other elements of the circuit may be found in circuits known in the art wherein the ends M and N are directly connected to supply voltage source +V.

Figure 2:
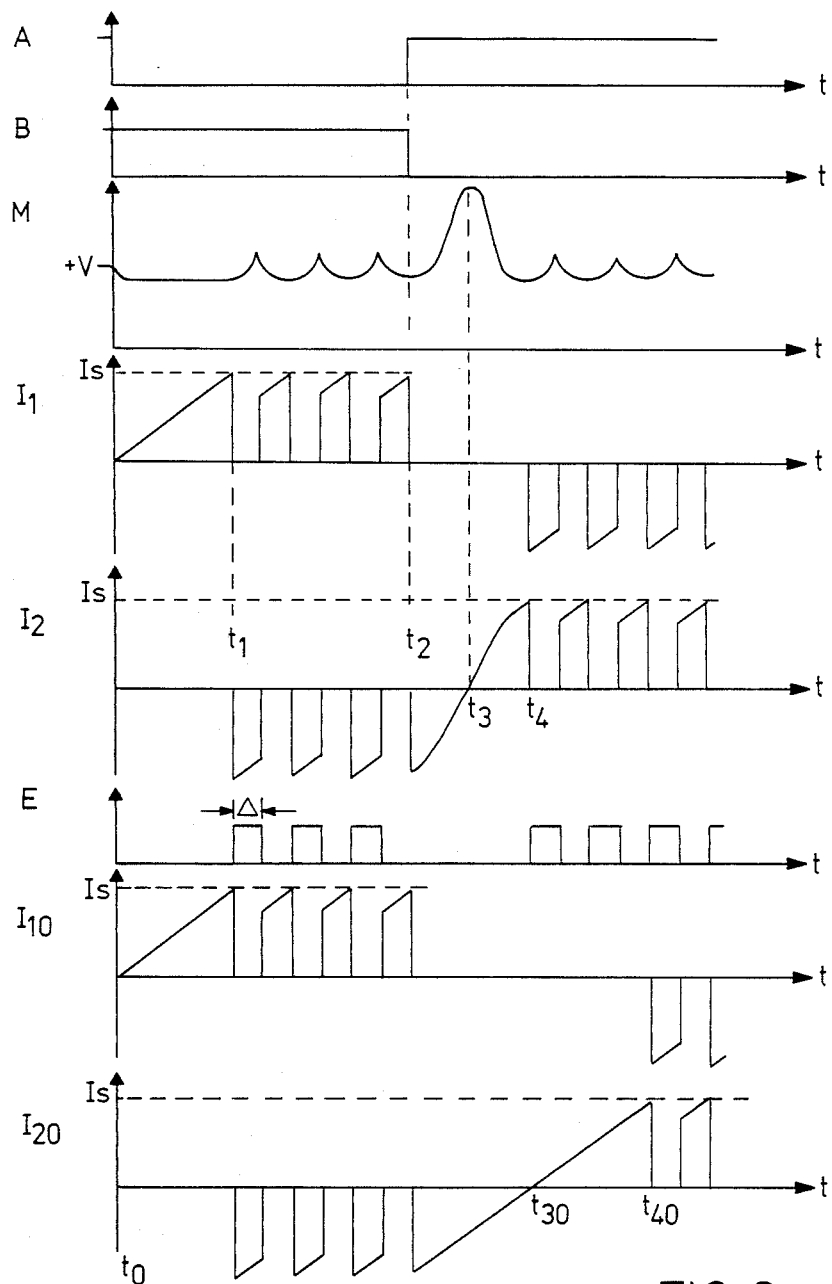
FIG. 2 shows the waveforms of the electrical signals present at predetermined points of the driving circuit of FIG. 1.

Referring now to FIG. 2 the action of capacitor 5 and diode 6 will be more fully discussed. The function of the circuit driving phases 3 and 4 is completely identical. In FIG. 2 diagrams A and B respectively show the levels of signals A and B; diagram M shows the waveform of the voltage present on node M common to windings 1 and 2; diagrams $I_1$ and $I_2$ show the waveforms of the currents flowing into windings 1 and 2 respectively; diagram E shows the level of the control or chopping signal E.

In order to better point out the action of capacitor 6 and diode 5, diagrams $I_{10}$ and $I_{20}$ of FIG. 2 show the waveforms of the currents flowing in windings 1 and 2 respectively when the driving circuit is of the conventional type; i.e., if node M is directly connected to supply voltage source +V. When energization control signals A and B are inactive (i.e., at logical level 1), the outputs of NOR gates 19, 20 are virtually connected to ground and therefore transistors 9 and 10 are cut OFF. In this case currents $I_1$ and $I_2$ (or $I_{10}$ and $I_{20}$) are null. Therefore the current flowing in resistor 13 is null too and signal E is at logical level 0. Node M (diagram M) is virtually at voltage +V. When signal A falls to logical level 0 (diagram A) phase 1 is energized at instant $t_0$. In such case, when the NOR gate 19 is of the "open collector" type, the base of the transistor 9 is connected to voltage source +$V_1$ through resistor 23. Transistor 9 goes therefore to saturation and an energization current starts to flow, through capacitor 5, in winding 1, and runs to ground through transistor 9. As soon as node M (diagram M) reaches voltage value +V $-V_D$ (where $V_D$ is the direct voltage drop on diode 6), diode 6 is forward biased and the winding is supplied by a voltage value +V $-V_D$ a little lower than +V. If diode 6 and capacitor 5 were missing, then winding 1 would be supplied by the voltage value +V. Initially the waveforms of current $I_1$ and $I_{10}$ are substantially the same; that is, the current increases exponentially to the winding time constant and to the supply voltage, which may be considered the same for the two cases. When current $I_1$ (or $I_{10}$) reaches a prefixed threshold value $I_S$ at time $t_1$, the output of current control circuit 28 goes to logic level 1 for a predetermined time interval Δ. Therefore the output of NOR gate 19 falls to logical level 0, transistor 9 is again cut off and the flow of current $I_1$ (or $I_{10}$) is switched off. The sudden switching off of current $I_1$ causes an induced current in winding 2 (diagram $I_2$ of FIG. 2) which flows from ground towards the supply source through diode 16 and has an initial intensity equal to $I_S$, since windings 1 and 2 generally have the same number of turns. Because of diode 6, the induced current $I_2$ can only pass through capacitor 5 which is therefore charged gradually. At the end of time interval $\Delta$, the charging voltage of capacitor 5 is $V_{C1}=Q/C$, where Q is the current pulse absorbed during inteval $\Delta$ and C is the capacity of capacitor 5. The voltage at node M therefore changes from value $+V -V_D$ to value $(+V -V_D)+V_{C1}$. As time interval $\Delta$ is generally very short, the voltage increase $V_{C1}$ may be neglected as regards $+V$ even if the capacitor has a little capacity value. So, during time interval $\Delta$, current $I_2$ decreases substantially in an exponential manner and has a waveform virtually equal to the one of current $I_{20}$ which would be present in a driving circuit without diode 6 and capacitor 5. At the end of interval $\Delta$, E falls again to logical level 0 and leads transistor 9 to saturation. Because of the magnetic coupling between phases 1 and 2, current $I_1$ quickly increases and, at the same time, current $I_2$ falls to 0 as quickly. Then current $I_1$ keeps on rising with the characteristic time constant of the circuit. It is to be noted that the slight voltage increase on node M owing to the charging of capacitor 5 causes a slight reduction of the time necessary for current $I_1$ to reach the threshold value $I_S$ (in FIG. 2 such effect is neglected). During the subsequent "chopping" operations the resulting phenomena are similar to the ones previously described. With regard to the case of driving circuit without capacitor 5 and diode 6, only a slight increase of the chopping frequency occurs. Such frequency increase is not pointed out in FIG. 2 where some simplifications have been made for ease of understanding.

The events occurring after the phase switching will now be discussed. At time $t_2$ signal A goes to logic level 1 and, at the same time, signal B falls to logic level 0. At such time $t_2$ signal E would be at logic level 0. In this case transistor 9, from ON state, would be switched to OFF state; however, transistor 10 is switched to the ON state. Therefore current $I_1$ quickly falls to 0 and a demagnetizing current $I_2$ runs through phase 2 and flows from ground to voltage source $+V$ through diode 16 and capacitor 5 which is charged. If at time $t_2$ signal E is at logic level 1, such demagnetization current is already running through phase 2. The voltage of node M increases from value $V -V_D$ up to value $V -V_D +V_{C2}$ which is reached when all the magnetization energy has been transferred to the capacitor (time $t_3$). Also in this case the capacitor charging voltage is $V_{C2}=Q/C$ where Q is the current pulse absorbed during the time interval $t_2 \div t_3$ and C the capacity value of the capacitor. The lower the capacity value is, the higher the voltage $V_{C2}$ which may be reached becomes. Practically it is suitable to choose capacity value C according to the winding inductance value in order that $V_{C2}$ approximately be equal to $+V$. In time interval $t_2 \div t_3$ the demagnetization speed, that is, the decrease speed of current $I_2$, increases as the voltage of node M increases. The length of interval $t_2 \div t_3$ is therefore shorter than the one of the corresponding interval $t_2 \div t_{30}$ in case of a driving circuit without diode 6 and capacitor 5. Starting from time $t_3$, current $I_2$ reverses (that is, it flows towards ground through transistor 10) and magnetizes the magnetic circuit in the opposite direction. As winding 2 is supplied by a voltage having an initial value $+V -V_D +V_{C2}$ higher (for instance, twice) then $+V$ and then decreasing to value $+V -V_D$ when capacitor 5 is discharged, the initial rising rate of the winding energization current is much higher than the one with energization current which would be obtained in circuits without diode 6 and capacitor 5. More precisely the increase of the rising rate is equal to $((V-V_D)+V_{C2})/V$. At time $t_4$ current $I_2$ reaches threshold value $I_S$ and therefore signal E goes to logical level 1. Time interval $t_3 \div t_4$ is therefore much shorter than the corresponding interval $t_{30} \div t_{40}$ which would be obtained in a circuit without diode 6 and capacitor 5. For instance, if charging voltage $V_{C2}$ is a little higher than $+V$, a reduction of time interval $t_3 \div t_4$ as to $t_{30} \div t_{40}$ of about 50% may be obtained. It follows that switching time interval $t_2 \div t_4$ is widely reduced as pertaining to the case when a circuit without diode 6 and capacitor 5 is used. It is therefore possible to obtain higher performances from a step motor controlled in such a way in regard to the available torque and also for high switching speeds. As previously stated the circuit is suitable to be used with current chopping control systems. During the chopping operations the magnetization energy, produced by the energization of a phase, is recovered; that is, it is transferred to the capacitor coupled to the same phase which is energized. The energy is then returned by the capacitor to such phase during the subsequent energization of it. This behaviour, besides increasing the motor efficiency, also prevents undesired energy being stored into an independent storage capacitor which could lead to unacceptable charging voltage level. It is, however, clear that the described circuit can also be used in driving systems without current chopping control where the current is only limited by the winding resistance or by auxiliary resistances. It is further compatible with chopping driving systems where the chopping control is performed by means of an auxiliary switching transistor common to each couple of windings magnetically coupled. U.S. Pat. No. 4,127,801 discloses a driving system of such time.

Figure 3:
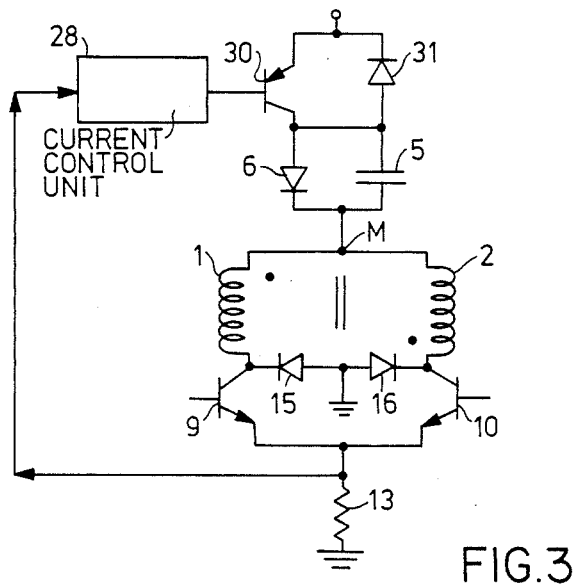
FIG. 3 is the simplified wiring diagram of a variant of the driving circuit of FIG. 1.

Referring now to FIG. 3 there is shown only two magnetically coupled phases, and how the driving circuit of the present invention can include the chopping system disclosed in the above-mentioned patent. (As most elements of FIG. 3 have features and functions equal to the ones of corresponding elements of FIG. 1, they have been identified with the same reference numbers. In FIG. 3 mutually coupled phases 1 and 2 are respectively controlled by transistors 9, 10 which are directly driven by control signals A, B without using NOR 19, 20. The current chopping is performed through a transistor 30 mounted between voltage source $+V$ and the parallel of diode 6 and capacitor 5. The emitter of transistor 30 is connected to the voltage source $+V$. The collector of transistor 30 is connected to the anode of diode 6 and to a plate of capacitor 5. A diode 31 is connected in parallel between emitter and collector of transistor 30, the diode cathode being connected to the emitter (source $+V$). A current control circuit 28 is connected to the base of transistor 30 and receives at its input from resistor 13 a signal proportional to the current flowing into the phases. In an alternative embodiment, control circuit 28, instead of operating on the basis of a real current measure, may act as a timer; that is, it may switch on transistor 30 in synchronism with the switching on of one of two transistors 9, 10 and switch off transistor 30 after a prefixed time interval. The circuit of FIG. 3 is identical to the circuit disclosed in the last-mentioned patent, except for the addition of diode 6 and of capacitor 5.

The working of the circuit of FIG. 3 is as follows.

The energization of a phase, for example phase 1, is obtained by switching on transistor 9 and transistor 30, if this was not already ON. A current $I_1$ starts to flow towards ground through transistor 30, diode 6, phase 1, transistor 9 and resistor 13. When current $I_1$, which increases exponentially, is equal to a certain threshold value $I_S$, or after a prefixed time interval, control circuit 28 switches off transistor 30. The switching off of transistor 30, and therefore the current change which follows, causes an induced current whose path is: ground, diode 16, phase 2, phase 1, transistor 9, resistor 13 (with very low resistance value), ground. As phases 1 and 2 generally have the same number of turns, such induced current is equal to half of the current previously flowing into phase 1. The induced current exponentially decreases with a time constant which is very long because the total inductance of the circuit is determined by the sum of the inductances of phases 1 and 2 series connected and of the corresponding mutual inductance. The current change must be such as to induce an e.m.f. sufficient to equalize the voltage drops in the circuit; that is, the resistive voltage drops and the voltage drops on transistor 9 and diode 16. Therefore node M is virtually at null potential. Diode 31 prevents a current from flowing from voltage source +V towards node M. As the circuit demagnetization takes place very slowly, in order to restore the demagnetization conditions corresponding to a phase current equal to $I_S$, it is enough to switch transistor 30 on again after a very long time interval. The chopping frequency may therefore be very low, also lower than the phase switching frequency. It is to be noted that during the chopping operations no energy is transferred to capacitor 5 which remains discharged. At the phase switching transistor 9 is switched off and transistors 10 and 30 are switched on. The sudden change of the residual current into phase 1 induces a current change into phase 2. A current of double intensity in relation to the pre-existing one settles into phase 2; such current flows from ground to voltage source +V through diode 16, phase 2, capacitor 5 and diode 31. The residual magnetic energy is therefore transferred to capacitor 5 which is charged. The demagnetization occurs with a demagnetization rate which increases at the time because the induced voltage of demagnetization is not equal to +V, but to to sum of voltage +V and of the charging voltage of capacitor 5. As soon as the demagnetization is completed, the energization of phase 2 starts and a current flows from voltage source +V through transistor 30, capacitor 5 and transistor 10. The magnetization takes place very quickly owing to an energization voltage equal to the sum of +V and of the charging voltage of capacitor 5. The same advantages of the circuit of FIG. 1 are therefore obtained.

It is to be noted that in FIG. 3 the positions of transistor 30—diode 31 set and of diode 6—capacitor 5 set may be interchanged. In other words, it is possible to connect the anode of diode 6 and capacitor 5 to voltage source +V directly, while transistor 30 and diode 31 may be connected between the parallel connection of diode 6, capacitor 5 and node M. The arrangement shown is, however, to be preferred as the connection of the emitter of transistor 30 to a pre-established voltage source +V allows easy driving of such transistor by means of resistive circuits. In the second case, because the emitter potential varies as the charging level of capacitor 5, a floating drive (for instance through a transformer) would be necessary.

Although a driving current which includes a capacitor and a by-pass diode for each pair of windings has been disclosed as discussed with the circuit of FIG. 1, it is, however, possible to use only one diode and only one capacitor for all the phases: in such case the same already-mentioned advantages are obtained although with a slight degradation. It is clear that, if the motor is operated by energizing one phase at a time, it is possible to use only one diode and only one capacitor for the circuit of FIG. 3 also. In case of single phase energization of the step motor, the circuits of FIGS. 1 and 3 may be further simplified by using only one of resistors 13, 14 and of control circuits 28, 29.

What is claimed is:

1. A step motor driving circuit for a motor having at least two pairs of magnetically coupled phase windings (1, 2) (3, 4) comprising control means (27) delivering switching commands to switching devices (9, 10, 11, 12), one switching device being associated to each winding, an energization current flowing in selected said windings from a voltage source when the related switching devices are switched on, said magnetically coupled windings being energized in a mutually exclusive way, said driving circuit comprising current chopping control means (13, 28, 19, 20) and further comprising a first current recycling diode (15, 16, 17, 18) in parallel to each of said switching devices for recycling currents induced in said magnetically coupled windings when switching off said devices characterized in that it comprises further:
   a second diode (6) and a capacitor (5), in parallel with each other and series connected between said voltage source and one of said pairs of magnetically coupled windings,
   said second diode enabling current flowing from said voltage source to either one or the other of said winding, said capacitor being charged by recycling current induced in any one of said windings and discharging on any one of said windings when the related switching device is switched on.

2. Step motor driving circuit for a motor having a plurality of pairs of magnetically coupled phase windings (1, 2, 3, 4) comprising control means (27) delivering switching commands to switching devices (9, 10, 11, 12), one switching device being associated to each winding, an energization current flowing in selected ones of said windings from a voltage source when the related switching devices are switched on, said magnetically coupled windings being energized in a mutually exclusive way, said driving circuit possibly comprising current chopping control means (13, 28, 19, 20) and further comprising a first current recycling diode (15, 16, 17, 18) in parallel to each of said switching devices, for recycling current induced in said magnetically coupled windings when switching off said devices, characterized in that it comprises further:
   a second diode (6) and a capacitor (5) in parallel with each other and series connected between said voltage source and all of said pairs of magnetically coupled phase windings,
   said second diode enabling the current flowing from said voltage source to any of said windings, said capacitor being charged by recycling current induced in any one of said windings and discharging on any one of said windings when the related switching device is switched on.

* * * * *